Sept. 27, 1949.  J. GREGG  2,483,004
PREMOLDING AND LOADING APPARATUS

Filed Aug. 30, 1945  2 Sheets-Sheet 1

INVENTOR
Jon Gregg
BY
ATTORNEY

Sept. 27, 1949.  J. GREGG  2,483,004
PREMOLDING AND LOADING APPARATUS
Filed Aug. 30, 1945  2 Sheets-Sheet 2

INVENTOR
Jon Gregg
BY
ATTORNEY

Patented Sept. 27, 1949

2,483,004

UNITED STATES PATENT OFFICE 2,483,004

PREMOLDING AND LOADING APPARATUS

Jon Gregg, New Hope, Pa.

Application August 30, 1945, Serial No. 613,540

4 Claims. (Cl. 18—34)

This invention relates to premolding and loading apparatus. It is particularly directed to apparatus for premolding a sole or the like article, and for loading the same into a final mold in which the article may be molded by use of heat and pressure and particularly by the use of high frequency current.

An object of this invention is to provide apparatus of the character described comprising a premolder adapted to receive an article to be molded, means to compress the article in the premolder, and means for transferring the article from the premolder to the final mold.

Yet another object of this invention is to provide a strong, durable and compact apparatus of the character described which shall be smooth and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a perspective view of a premolding and loading apparatus embodying the invention;

Figure 1:
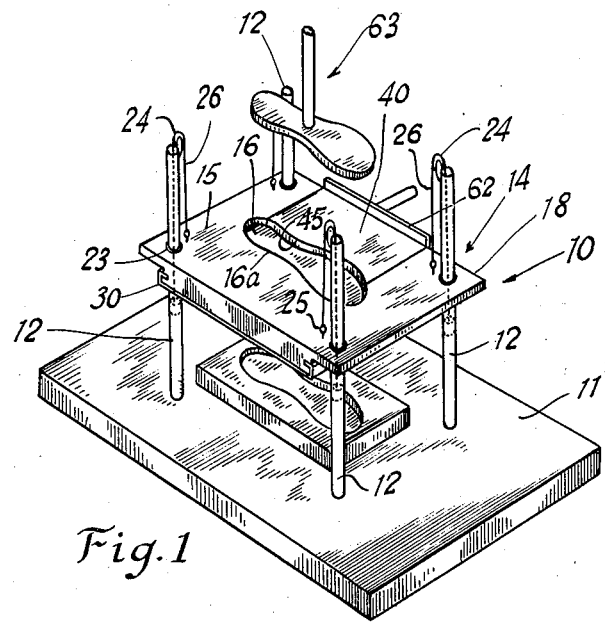

Referring now in detail to the drawing, 10 designates apparatus embodying the invention. The same comprises a base 11 provided with four upstanding tubular guide posts 12. Slidably mounted on the guide posts 12 is a premolder 14.

The premolder 14 comprises a member 15 formed with a through opening 16 having partly the shape of a sole or other article to be molded. Extending from the opening 16 is a slot 17 leading to one edge 18 of plate 15. Slot 17 forms a pair of parallel edges 18a each formed with a longitudinal groove 19. Plate 15 is formed with extending flanges 20 adjacent its upper surface. Below the flanges 20 are outer parallel side surfaces 21 each formed with a horizontal groove 22. Plate 15 is formed at the four corners thereof with through openings 23 to receive the tubular posts 12. At the upper ends of the tubular posts 12 are pulleys 24. Connected to plate 15 as at 25 are cables 26 extending over pulleys 24 and passing downwardly through the tubular posts 12. Any suitable means may be provided to simultaneously pull the cables for lifting or lowering plate 15.

Slidably mounted on the underside of the preformer plate 15 is a bottom plate 30 having upwardly extending side walls 31 from which extend inwardly directed flanges 32 slidably engaging within grooves 22.

It will now be understood that plate 30 may slide transversely of plate 15 and covers the underside opening 16 as well as slot 17.

Slidably mounted on plate 15 is a presser plate 40. Presser plate 40 fits within slot 17 between edges 18a. Plate 40 is formed at the sides thereof with longitudinal guide ridges 43 slidably received in the grooves 19. Said plate 40 has an inner edge 45 complementary to edge 16a of opening 16 together therewith forming the periphery of a premold cavity.

On the base 11 and below the plate 15 may be placed the body 50 of the final mold M. Said final mold M comprises said body 50 made of heat insulating, electric non-conducting material. The mold M may be constructed as disclosed in my co-pending abandoned application Serial No. 613,539, filed on the 30th day of August, 1945.

Said mold body is formed with a through opening 52 and with an internal shoulder 53. In the bottom of the mold body is a bottom plate 54 made of conducting material and provided with peripheral flanges 55 adapted to rest on shoulder 53. The mold M further comprises a top ram 56 likewise made of conducting material and adapted to enter the upper portion of opening 52 to form with the bottom plate 54 the mold cavity 60.

Figure 2:
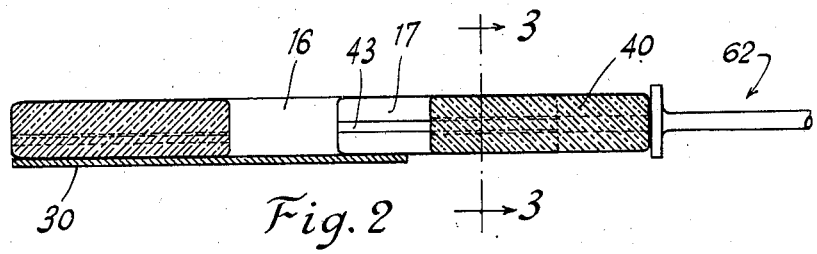
Fig. 2 is a transverse cross-sectional view of the premolder.
Figure 3:
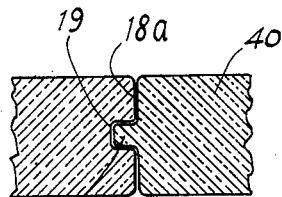
Fig. 3 is a partial, cross-sectional view taken on line 3—3 of Fig. 2.
Figure 4:
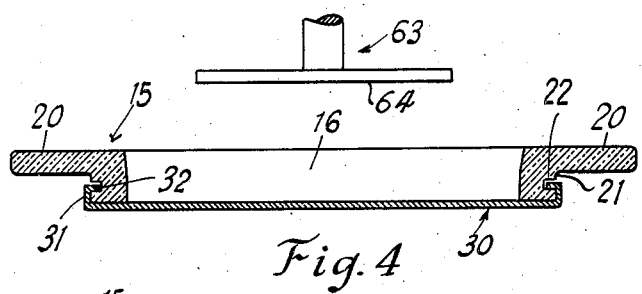
Fig. 4 is a longitudinal cross-sectional view taken through the premolder.

At one side of presser 40 is a plunger 62 of any suitable type adapted to press the presser plate 40 to the left shown in Fig. 2 toward opening 16. The plunger 62 may be operated by any suitable pressure apparatus.

Also slidably mounted above opening 16 is a vertical plunger 63 adapted to press downwardly. The plunger 63 has a plate 64 adapted to enter opening 16 for the purpose hereinafter appearing.

Figure 5:
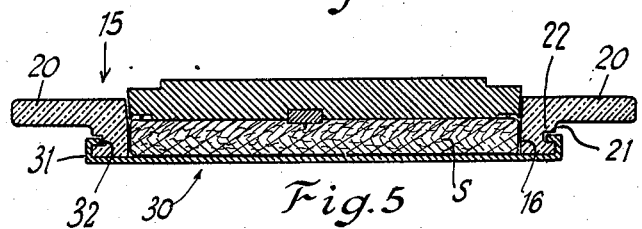
Fig. 5 is a view similar to Fig. 4 but showing a sole in the premolder and the ram of the final mold placed on the sole.
Figure 6:
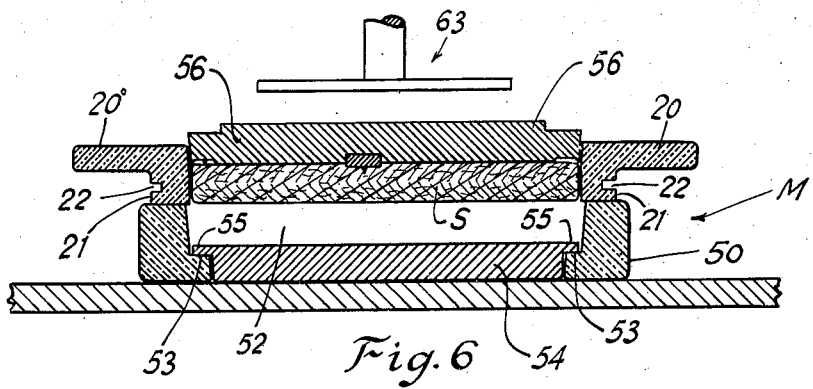
Fig. 6 is a view similar to Fig. 5 but illustrating the method of transferring the sole from the premolder to the final mold.
Figure 7:
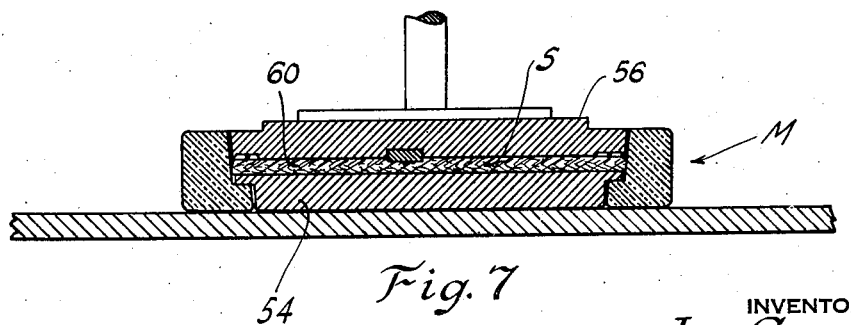
Fig. 7 is a view similar to Fig. 6 and showing the sole and ram transferred from the premolder to the final mold.

The operation of the apparatus will now be described:

Plate 15 is first raised. Plunger 62 is retracted. Pressure plate 40 is likewise retracted. The bottom plate 30 is moved to a position underlying opening 16. A sole S or like article to be molded is placed within opening 16 to rest on plate 30. The thickness of plate 15 or the height of opening 16 is preferably greater than the height of the sole, as shown in Fig. 5. The top ram 56 is then placed in opening 16 above the sole S. The plunger 62 is then actuated to the left to press plate 40 against the sole S to premold the same. Plate 15 is then lowered until it rests on the mold body 50, plate 30 being withdrawn to uncover the bottom of opening 16. Plunger 63 is then actuated downwardly to transfer the sole S to the mold body 50. At the same time, the top ram 56 is pressed downwardly to compress the sole S. The ram 56 may then be locked to the body. Thereafter plate 15 may be raised. The mold may then be transferred to high frequency apparatus such as shown in my co-pending application Serial No. 610,261, filed on the 11th day of August, 1945, or may be heated in any other suitable manner. The sole S may be of the type shown in my Patent No. 2,361,938.

Although the premolding and molding apparatus is illustrated herein in connection with a sole it will be understood that any other suitable article may be premolded and transferred to a final mold, it merely being necessary to make the shape of the mold openings suitable to receive the article to be molded.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. Apparatus of the character described comprising a base, a mold body on the base, a plurality of posts on the base, a premold plate slidably mounted on the posts and disposed above the mold body, said premold plate having an opening to receive an article to be molded, plunger means for transferring said article wholly from the premold plate to the mold body, and means to apply side pressure to the article to be molded while it is in the premold plate.

2. Apparatus of the character described comprising a premolder adapted to receive an article to be premolded, means movable on the premolder for applying side pressure to said article, a final mold, and means movable in a direction perpendicular to the direction of movement of the first means for transferring the article in the premolder, wholly to the final mold.

3. Apparatus of the character described comprising a base, a final mold on the base, a premolder, means to support the premolder above the final mold for sliding movement toward and away from said final mold, said premolder being provided with means to receive an article to be premolded, and plunger means movable relative to the premolder, for transferring the article to be premolded from the premolder to the final mold, and means movable on the premolder in a direction perpendicular to movement of the plunger means, to apply side pressure to the article to be premolded.

4. Apparatus of the character described comprising a base, a final mold on the base, a premolder, means to support the premolder above the final mold for sliding movement toward and away from said final mold, said premolder being provided with means to receive an article to be premolded, means on the premolder to apply side pressure to the article to be premolded, a bottom plate slidably mounted on said premolder to support the article within the premolder, and said bottom plate being adapted to be moved to a position for uncovering the article within the premolder to permit said article to be transferred to the final mold and means for transferring the premolded article from the premolder to the final mold.

JON GREGG.

REFERENCES CITED

The following references are of record in the file of this patent:

UNITED STATES PATENTS

| Number | Name | Date |
| --- | --- | --- |
| 551,741 | Wolcott | Dec. 17, 1895 |
| 573,514 | Hughes et al. | Dec. 22, 1896 |
| 767,872 | Davies | Aug. 16, 1904 |
| 1,140,577 | Cooke et al. | May 25, 1915 |
| 1,265,579 | Zaleski | May 7, 1918 |
| 1,476,782 | Wagner | Dec. 11, 1923 |
| 1,731,006 | Goodwin et al. | Oct. 8, 1929 |
| 1,822,172 | Pfleumer et al. | Sept. 8, 1931 |
| 1,964,911 | Haas | July 3, 1934 |
| 2,157,961 | MacCallum | May 9, 1939 |
| 2,325,687 | Kux | Aug. 3, 1943 |
| 2,351,713 | Sayre | June 20, 1944 |
| 2,364,029 | Ryan | Nov. 28, 1944 |

FOREIGN PATENTS

| Number | Country | Date |
| --- | --- | --- |
| 272,419 | Germany | Feb. 24, 1912 |